Dec. 19, 1922.

A. J. HIGGS.
TRACTOR WHEEL.
FILED MAY 16, 1921.

1,439,311

INVENTOR:
Arthur James Higgs

By Otto Munk.

his ATTORNEY.

Patented Dec. 19, 1922.

1,439,311

UNITED STATES PATENT OFFICE.

ARTHUR JAMES HIGGS, OF BOWMANS, SOUTH AUSTRALIA, AUSTRALIA.

TRACTOR WHEEL.

Application filed May 16, 1921. Serial No. 470,142.

*To all whom it may concern:*

Be it known that ARTHUR JAMES HIGGS, a subject of His Majesty the King of Great Britain, and citizen of the Commonwealth of Australia, residing at District Road, Bowmans, in the State of South Australia, in the Commonwealth of Australia, hath invented certain new and useful Improvements in Tractor Wheels, of which the following is a specification.

My invention relates to improvements in tractor wheels, the object of the same being to provide a wheel which will not only firmly grip the soil and prevent slipping but will at the same time be self cleaning, that is to say, it will not readily pick up and accumulate a quantity of loose earth.

In constructing my wheel I prefer to use a metal hub and metal spokes which radiate from the centre and are attached at each side to a metal frame, but the spokes extend beyond the periphery of the arm, the extended portion being deflected inwardly to form a base for the treads which consist of a box like construction encasing a core or cross plate of strong wood, and each tread so formed is externally provided with an outwardly projecting plate which is designed to act as a grip or nonskidding member.

The spokes are preferably arranged in pairs radiating from the centre opposite to each other but the treads instead of being mounted at right angles to the sides of the wheel thus bridging the intervening space between opposite spokes are arranged diagonally so that the tread attached to each spoke on one side of the wheel is attached at its opposite end to the spoke in advance of its fellow on the opposite side of the wheel.

But in order that my invention may be clearly understood I will now describe the same by aid of the accompanying illustrative drawings wherein—

Figure 4:
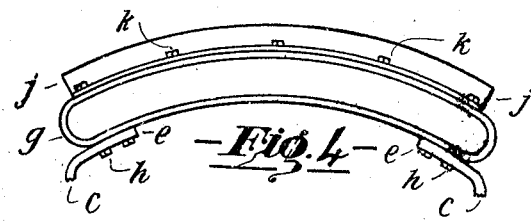
Fig. 4 is a side view of the tread.
Figure 5:
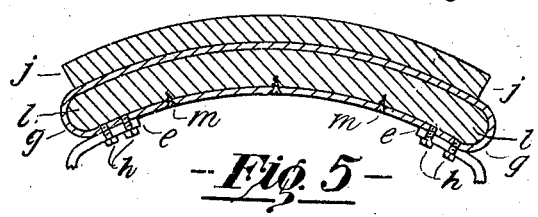

Fig. 5 a section of Fig. 4.

In each of the illustrations similar letters of reference are used to denote similar or corresponding parts wherever they occur.

Figure 3:
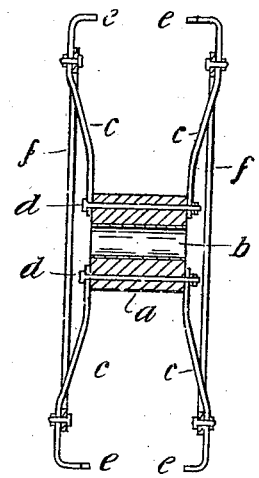
Fig. 3 is a sectional elevation of the frame of wheel taken vertically through the hub.

In the drawings $a$ is the hub of the wheel constructed in any suitable manner such for instance as a solid metal hub or it may be a wooden hub provided with a metal wearing sleeve as indicated at $b$. To the hub so formed a series of metal spokes $c$ are attached so as to radiate outwardly, the spokes being arranged in pairs on opposite sides of the wheel and may be secured by the hub bolts $d$. These spokes are preferably deflected outwardly from the hub as clearly indicated in Fig. 3, their extremities being inturned as shown at $e$ to form a support for the tread. Rigidity is given to the spokes and they are further maintained in position by means of the metal rings $f$.

Figure 1:
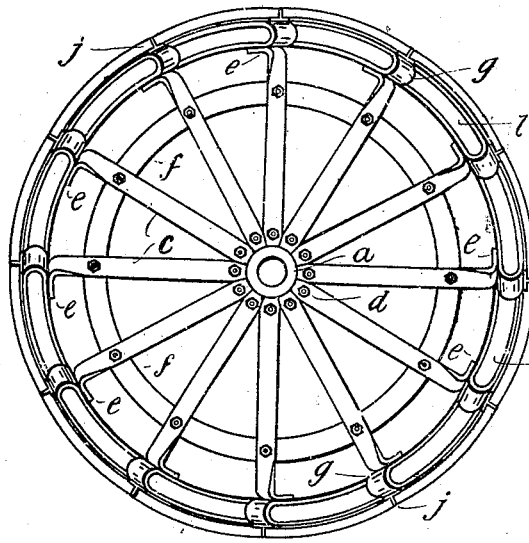
Fig. 1 is a side elevation of the wheel.
Figure 2:
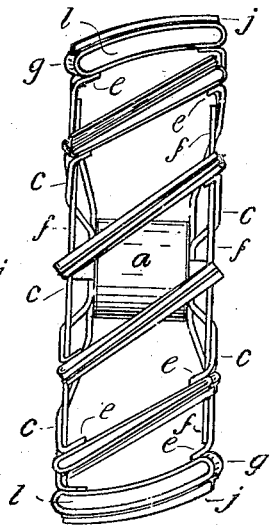
Fig. 2 is a front view of same.

In the construction of my wheel I do not use a tyre or band but I construct a tread frame $g$ of strong metal which is preferably curved as shown and is secured to the inturned extensions $e$ of the spokes $c$ and is secured in position by the tread bolts $h$. These frames bridge the space between the opposite sides of the wheel but instead of being carried straight across in alignment with the axle they are arranged diagonally as clearly indicated in Fig. 2 of the drawings, and being so arranged they are curved in the manner indicated, the radius of the curve being such as to enable them to present a fairly even tread on the surface of the ground when the wheel is in motion. These curves therefore will require to be varied or adjusted in accordance with the diameter of the wheel and the diagonal pitch or inclination of each tread.

The tread frames are furnished with a gripping fin or nonskidding member $j$ which is preferably formed with angle or T iron and may be fastened to the frame by the bolts $k$. Inside of the tread frame I insert a packing plate of wood $l$ which affords strength and rigidity to the structure, the packing plate being likewise retained in position by screws, studs or the like as indicated at $m$. To enable this device to be traversed over properly formed metal roads and tracks without damage a circumferential tyre or cover of metal is placed outside of the treads and secured by bolts or other means. This however forms no part of my invention and is not illustrated in the drawings.

The wheel which I have described in the foregoing specification affords an easy and continuous tread on the surface of the ground and in addition to being comparatively light and expensive it has the merit of being capable of cleaning itself, that is to say the treads do not become clogged up with a continuous band of clay or other adhesive soil as the spaces formed between the treads prevent such accumulation and enable much of the matter which would otherwise be picked up and retained to be dropped through the spaces between the various treads.

Having now fully described and ascertained my said invention and the manner in which it is to be performed I declare that what I claim is—

1. A tractor wheel comprising a hub, spokes radiating from said hub, a series of tread frames designed to be attached to the outer ends of said spokes and having a space formed therein for the accommodation of packing plates.

2. A tractor wheel comprising a hub, spokes radiating from opposite sides of said hub, tread frames designed to be attached to the outer ends of said spokes diagonally across the intervening spaces formed by the spokes on opposite sides of said hub, and an arched gripping fin fixed to said plates and projecting outwardly therefrom.

3. A tractor wheel comprising a hub, spokes radiating from opposite sides of said hub, and a series of tread-plates arranged circumferentially on said spokes and being attached to the spoke ends diagonally across the intervening spaces formed by the spokes on opposite sides of said hub.

4. A tractor wheel comprising a hub, spokes radiating from opposite sides of said hub, a series of tread-plates arranged circumferentially on said spokes and being attached to the spoke ends diagonally across the intervening spaces formed by the spokes on opposite sides of said hub, and gripping elements fixed diagonally upon said tread-plates.

5. A tractor wheel comprising a hub, spokes radiating from opposite sides of said hub, and tread-plates attached to spokes on opposite sides of the wheel, the tread-plates being curved to conform to the diameter of the wheel and the pitch of the spokes so as to form a substantially level tread on the surface of the ground during the rotation of the wheel.

In testimony whereof he hath affixed his signature in presence of two witnesses.

ARTHUR JAMES HIGGS.

Witnesses:
 FREDERICK PELHAM TOLER-ROWLEY,
 WALTER HARRY LUXFORD VIRGO.